3,297,644
POLYMERIZATION OF GASEOUS, MONOMERIC FORMALDEHYDE
Kuno Wagner, Leverkusen, Kurt Klinkmann, Monheim, and Hermann Wolz, Leverkusen, Germany, assignors to Farbenfabriken Bayer Aktiengesellschaft, Leverkusen, Germany, a German corporation
No Drawing. Filed June 5, 1963, Ser. No. 285,569
Claims priority, application Germany, June 19, 1962, F 37,107
6 Claims. (Cl. 260—67)

This invention relates to a method of polymerizing formaldehyde by conducting gaseous, monomeric formaldehyde in an organic liquid used as polymerization medium and pertains more specifically the preventing initial polymerizing of the gaseous monomeric formaldehyde in the feed system for the polymerization.

When producing polyoxymethylenes of high molecular weight from formaldehyde vapors with a high water content, with the aid of stannous compounds as polymerization catalysts, in accordance with U.S. patent application Ser. No. 182,641 the formaldehyde vapors are introduced through heated supply lines into the polymerization vessel. The transport of the formaldehyde vapors through hot conduits is a necessary preliminary condition for the continuous production of formaldehyde vapors and hence a continuous method of polymerization, since at temperatures below 70° C., aqueous formaldehyde vapors, especially in the presence of traces of formic acid, show a particularly strong tendency to form polymers similar to paraformaldehyde (so-called initial polymers) so that the transport and inlet systems become clogged, considerable losses in yield due to initial polymerization occur and a safe handling of the formaldehyde during its production and introduction into polymerization media is not possible.

It has also been found that, when pyrolysing paraformaldehyde at relatively low excess pressure, the formation of sugar-like aldol condensation products catalyzed by basic impurities or heavy metal salts and oxides proceeds to a greatly increased degree, and almost quantitatively at 3–4 atmospheres.

As the transport conduits extending from the pyrolysis reactors or formaldehyde production plants are heated to temperatures of 75–200° C., advantageously to temperatures of 85–110° C., it is possible to prevent an initial polymerization, but not in the inlet pipe systems. Even if a good heat insulation is provided and if the most suitable construction of inlet pipes is used, certain temperature balancing occurs in the introduction zone. This is because the polymerization medium is substantially colder, so that a formation of initial polymer occurs in a continuous operation. This formation of initial polymer not only leads to the said disturbances but it also reduces the quality and uniformity of high molecular weight polyoxymethylenes formed, since initial polymers are admixed in uncontrollable manner with the polymers. With the assistance of mechanically moving devices such as scrapers, blades, stirrers, etc., or by suction intake of the formaldehyde vapors by the jet suction principle, it is not possible in a continuous operation to prevent a constriction in the cross-section of the inlet pipe and to keep the inlet velocity of the formaldehyde vapors constant.

As well as the secondary reactions (aldol condensation) occurring to an increased extent due to a rise in pressure, the strong increase in the pressure results in a reduction of the residence time of the formaldehyde vapors in the polymerization reactor, so that considerable quantities of formaldehyde escape from the polymerization reactor with increasing constriction of the cross-section. The raising of the yield of polymer by polymerization under pressure is restricted by the secondary reaction taking place under these conditions.

It has now been found that the aforementioned disadvantages can be overcome by supplying the formaldehyde vapors to the inlet devices together with vapors and/or aerosols of inert organic solvents which are heated to temperatures from 60° to 160° C., whereby initial polymerization reactions, polymerization reactions or pressure fluctuations in the feed systems, transport pipes and reactors are prevented. The vapors of the solvent should advantageously have a good solubility in the polymerization medium and in addition have a condensation point which corresponds to or is considerably higher than the polymerization temperature, so that an almost quantitative condensation of the vapors takes place in the polymerization reactor. It is true that the process according to the invention can also be conducted with inert gases, as, for example, nitrogen, carbon dioxide, hydrogen, noble gases and low-boiling point hydrocarbons such as methane, ethane or propane, but when the uptake of formaldehyde in the polymerization vessels is small at the preferred polymerization temperature of 0° to 90° C., since large quantities of formaldehyde discharge with the gases which are less soluble in the polymerization media. Gases or vapors which can be condensed considerably below 0° C. are consequently of very little interest for the process. According to a preferred form of the process according to the invention, the vapors and/or aerosols which are used have temperatures from 85° to 110° C. and are employed in a quantity from 0.7 to 2 parts by weight, per part by weight of formaldehyde.

The following inert solvents, which are supplied in vapor form to the formaldehyde gases, are, for example, suitable for carrying out the process:

aliphatic hydrocarbons such as hexane, heptane, petroleum ether, a hydrocarbon mixture with 12–18 carbon atoms (Mepasin), chlorinated hydrocarbons such as methylene chloride, carbon tetrachloride, 1,2-dichloropropane;
cycloaliphatic hydrocarbons such as cyclohexane and decahydronaphthalene;
araliphatic hydrocarbons such as toluene, ethyl benzene, diisopropyl benzene and xylene;
aromatic hydrocarbons such as benzene and substituted derivatives such as chlorobenzene, o-dichlorobenzene, anisole and nitrobenzene; esters such as ethyl acetate, butyl acetate and propionic acid ethyl ester;
ethers such as di-n-propyl ether, diisopropyl ether, di-n-butyl ether, dioxane, tetrahydrofuran; and
acetals such as formaldehyde di-n-butyl acetal and formaldehyde dibenzyl acetal.

In carrying out the process, the organic vapors to be produced by boiling, spraying, etc. can be admixed with the formaldehyde gas. However, it is also possible to produce the vapors in the production reactors for the formation of formaldehyde, for example, by effecting the pyrolysis of paraformaldehyde in such aliphatic hydrocarbons which have a sufficiently high vapor pressure at the decomposition temperature of paraformaldehyde at normal or reduced pressure.

The process of the invention can be employed with formaldehyde vapors produced in different ways and of variable purity, for example, with vapors which are produced by pyrolysis of paraformaldehyde of different water content and methoxyl content in bulk (warm, fluidized bed), in different heat transfer agents (e.g. paraffin oil, hydrocarbon mixtures with 12–18 carbon atoms, phthalic acid dibutyl ester, polypropylene glycol, polyethylene glycol, diisopropyl benzene or decalin) at normal or reduced pressure, or even with formaldehyde vapors which are produced by methanol dehydrogenation or even by pressure distillation of aqueous formaldehyde solutions.

In addition to the above advantages provided by the process, the procedure followed according to the invention also suppresses to a considerable degree the secondary reactions of the formaldehyde vapors in the transport pipes, particularly at corroded sections, for example, disproportionation reactions of the formaldehyde which proceed in accelerated form due to metal oxides and other metal compounds.

The following examples explain the process without limiting it in any way.

Example 1

140 parts by weight of paraformaldehyde with a water content of 2% are pyrolyzed in 200 parts by weight of a wash benzine fraction with the boiling point 124–130° C. At 124° C., there is strong evolution of formaldehyde and simultaneous boiling of the pyrolysis liquid. The vapor mixture is conducted without any further initial purification through conduits heated to 95° C. and through a heated inlet pipe (cross-section 5 mm.) into methylene chloride which is cooled to 20° C. and which contains 0.5 part by weight of the stannous salt of 2-ethyl caproic acid per liter of methylene chloride. The polymerization starts immediately and when the experiment is completed, the inlet pipe is completely free from initial polymer and polymer depositions.

Example 2

The procedure is as set out in Example 1, but the pyrolysis takes place in a hydrocarbon mixture with 12–18 carbon atoms with a boiling point of 220–300° C. The discharged formaldehyde vapors are diluted by the partial pressure of the hydrocarbon mixture with 12–18 carbon atoms and additional aerosol formation in the ratio by weight of about 5:1.

Before these vapors enter the inlet pipe, methylene chloride vapors at a temperature of 95° C. are admixed in the ratio 1:1, based on formaldehyde. Here also the introduction proceeds freely, as in Example 1.

Example 3

The procedure is as set out in Example 2, but the hydrocarbon mixture with 12–18 carbon atoms is replaced by polypropylene glycol polyether and the methylene chloride is replaced by cyclohexane vapors preheated to 80° C., a ratio by weight of 1:1 being approximately maintained between the mixture of formaldehyde and cyclohexane. The vapor mixtures are introduced without any interruption into the polymerization medium.

Example 4

In accordance with Example 2 and using an industrial apparatus, the formaldehyde vapors are introduced together with methylene chloride vapor into methylene chloride, which is at boiling point (40° C.) and is kept boiling by the heat of polymerization being established.

*Execution.*—About 10–15 kg. of formaldehyde per hour pass through supply pipes with a cross-section of 50 mm., the pipes being heated to 150° C. Before entering a polymerization reactor with a capacity of 1000 liters, the vapors are diluted with about 12 kg. of methylene chloride per hour, which is superheated to 100–140° C. After a period of introduction lasting 100 hours, the inlet pipe with a cross-section of 20 mm. is completely free from initial polymer and polymer depositions and can be used without cleaning for introducing more formaldehyde.

We claim:

1. In the process of producing high molecular weight polyoxymethylene by feeding a stream of gaseous formaldehyde into contact with catalyst-containing liquid polymerization reaction medium at a temperature of 0–90° C. and recovering resulting high molecular weight polyoxymethylene, the improvement which comprises forming a feed stream at a temperature of from about 70 to 160° C. and containing gaseous formaldehyde and a reaction inert organic solvent in a weight ratio of formaldehyde to organic solvent of from about 1:0.7 to about 1:2, the phase of said organic solvent in said feed stream being selected from the group consisting of aerosol, gas and mixtures thereof and said organic solvent being soluble in said liquid polymerization reaction medium and introducing said feed stream into said liquid polymerization reaction medium at said temperature of from about 70 to about 160° C.

2. The process of claim 1 wherein said solvent is liquid at the temperature of polymerization.

3. The process of claim 1 wherein the stream is at a temperature of from about 85 to about 110° C and the ratio by weight of formaldehyde to solvent therein is from 1:1 to 1:2.

4. The process of claim 1 wherein said solvent is cyclohexane.

5. The process of claim 1 wherein said solvent is wash benzine fraction having a boiling point of 124 to 130° C.

6. The process of claim 1 wherein said solvent is a mixture of hydrocarbons containing from 12–18 carbon atoms and boiling at a temperature of from 220 to 320° C.

References Cited by the Examiner

UNITED STATES PATENTS

| | | | |
|---|---|---|---|
| 2,768,994 | 10/1956 | MacDonald | 260—67 |
| 2,841,570 | 7/1958 | MacDonald | 260—67 |
| 2,951,059 | 8/1960 | Axtell et al. | 260—67 |
| 3,007,897 | 11/1961 | Behrends et al. | 260—67 |
| 3,226,444 | 12/1965 | Fischer et al. | 260—606 |

WILLIAM H. SHORT, *Primary Examiner.*

L. M. MILLER, *Assistant Examiner.*